US005208442A

United States Patent [19]

Ahola et al.

[11] Patent Number: 5,208,442

[45] Date of Patent: May 4, 1993

[54] PLASMA ARC TORCH HAVING ADJUSTABLE ELECTRODE

[75] Inventors: Tom Ahola; Kari Ahola, both of Klaukkala, Finland

[73] Assignee: Rotaweld Oy, Klaukkala, Finland

[21] Appl. No.: 833,034

[22] Filed: Feb. 10, 1992

[30] Foreign Application Priority Data

Feb. 25, 1991 [FI] Finland ..................... 910883

[51] Int. Cl.$^5$ ..................... B23K 9/00

[52] U.S. Cl. ..................... 219/121.52; 219/121.48; 219/75; 219/121.5

[58] Field of Search ..................... 219/121.5, 121.52, 119, 219/76.16, 75, 121.48

[56] References Cited

U.S. PATENT DOCUMENTS

| | | | |
|---|---|---|---|
| 4,367,393 | 1/1983 | Yerushalmy | 219/121.52 |
| 4,517,437 | 5/1985 | Yerushalmy et al. | 219/75 |
| 4,628,177 | 12/1986 | Dempsey et al. | 219/121.52 |
| 4,716,269 | 12/1987 | Carkhuff | 219/121.48 |
| 4,788,401 | 11/1988 | Kleppen | 219/75 |

*Primary Examiner*—Mark H. Paschall
*Attorney, Agent, or Firm*—Armstrong, Westerman, Hattori, McLeland & Naughton

[57] ABSTRACT

Disclosed is a plasma torch in which the position of the center electrode (1) is adjustable relative to the orifice of the plasma torch (2). The invention is based on a construction in which the center electrode (1) is mounted to the body part (9) of the plasma torch by way of a pivotal ball joint (7, 23), whereby the electrode (1) can be pivotally rotated in said joint (7, 23), thus making it possible to align the electrode tip to the orifice center of the plasma nozzle (2). The spherical element (7) of the pivotal joint is attached to the bearing box (23) with the help of a tightening gland nut (11, 12). The depth of the center electrode (1) can be adjusted by rotating a depth adjustment gland nut (14), which is attached to the spherical element (7) by a threaded joint. Due to its versatile adjustability the function of the plasma torch can be maintained in a stable range, thus significantly contributing to reduced wear and damage of the plasma nozzles.

6 Claims, 2 Drawing Sheets

PLASMA ARC TORCH HAVING ADJUSTABLE ELECTRODE

BACKGROUND OF THE INVENTION

1. Field of the Invention

The present invention relates to a plasma arc torch having a cover, an electrode, body parts and a nozzle having an orifice.

2. Description of the Related Art

In a plasma arc torch the main arc utilized for welding is excited between the torch electrode and the workpiece. The nozzle section of the torch is comprised of two coaxial cavities. The inner cavity houses a tungsten electrode and the end of the cavity is provided with an orifice about the tip of the electrode. A plasma gas is fed into this cavity. The inner cavity is enclosed by another cavity whose exit orifice surrounds the exit hole of the inner cavity. The shielding gas which envelops the electric arc is fed to this outer cavity.

Because the electric arc of the plasma torch is maintained in a gas atmosphere between the workpiece and the electrode, the gas must be ionized before the ignition of the main arc in order to make the gas electrically conductive. This ionization is accomplished by means of a pilot arc excited between the electrode and the nozzle that forms the inner cavity. The pilot arc ionizes the plasma gas, whereby a conductive ionized gas path is formed between the workpiece and the electrode, thus providing proper ignition conditions for the main arc.

The main arc must be maintained only between the electrode and the workpiece, because such a high-energy electric arc so between the electrode and the nozzle would rapidly destroy the nozzle. Normally, the cooling of the nozzles and the electrical and magnetic forces acting in the nozzle prevent the main arc from being excited between the electrode and the nozzle. This requires, however, that the electrode tip must be exactly aligned to the electrical center point of the nozzle. If the nozzle orifice and the electrode tip have symmetrical shapes, the electrical center point generally also coincides with the geometric center point.

The shape of the nozzle orifice and thus the position of the electrical center point may change during welding for several reasons: The electrode tip may be offset from the electrical center point already from the start of welding due to unavoidable production tolerances of the torch, nozzle and electrode. Resultingly, the position of the nozzle orifice undergoes slow shifting during welding, causing the plasma jet to deviate. The orifice shape itself may often also become deformed due to welding splashes and accumulation of other debris. When the plasma jet direction diverges, working with the plasma torch becomes difficult and finally impossible. The welding seam quality worsens and repeatability will be lost due to the varying behavior of the plasma arc. The pilot arc weakens, and the ignition of the main arc becomes more difficult so that finally the main arc cannot be ignited at all. At this stage the nozzle and generally the electrode as well must be replaced. As nozzles in plasma torches are easily damaged, nozzle changes become the cause of frequent interruptions in welding operations, which thus are hampered by the high consumption rate of the nozzles.

In plasma torches intended for manual welding, altering the position of the electrode is possible only through machining of the electrode tip, because the electrode is permanently aligned with respect to the torch body by means of ceramic support pieces. Reshaping of the electrode is a slow and time-consuming operation, since the work must be done in a machine due to the high tolerance requirements.

In larger plasma torches used in mechanically controlled welding, the electrode position can be adjusted with the help of an eccentric mechanism. These torches have a large-diameter nozzle orifice, and the main arc is ignited by means of a high-frequency arc which rotates in the gap between the electrode and the nozzle. The centering of the electrode is accomplished by first igniting the high-frequency arc and then aligning the electrode with the help of the eccentric mechanism until the arc starts to rotate about the nozzle orifice in a symmetrical manner. Such a mechanism is, however, too massive for hand-held torches and can be used only in torches ignited by a high-frequency arc. The electrode position is not adjustable by such an arrangement after the main arc has been ignited, because the torch is not gas-tight during the adjustment.

SUMMARY OF THE INVENTION

It is an object of the present invention to achieve an assembly which provides an adjustment facility for the electrode tip position in a plasma torch.

The invention is based on attaching the electrode of the plasma torch to the body of the torch by way of a tightenable ball joint, whereby the electrode can be pivotally rotated in the joint in order to move its tip, after which the electrode can be locked in place by tightening the joint.

The invention provides outstanding benefits.

With the help of the construction according to the invention, the electrode can be readily centered in the nozzle orifice. Approximate centering is initially performed visually by looking at the electrode in the direction of the nozzle orifice and manually rotating the joint to bring the electrode to the orifice center. This operation aligns the electrode with the geometric center of the nozzle. From here, the finer centering to the electrical center of the nozzle can be performed with the pilot arc ignited. To accomplish this, the electrode is rotated until the pilot arc is directed straight away from the tip of the torch, whereby the electrode tip is exactly aligned with the electrical center and thus the arc operates optimally. When nozzle center point undergoes a sideways shift during welding, the main arc will be diverted from the center axis, resulting in more laborious welding and deteriorated weld quality. By virtue of the present invention, however, the electrode can be rotated back to the correct position during welding. A prompt adjustment facility of the electrode to the new electrical center avoids changes in arc properties, thus maintaining a high weld quality. Nozzle wear is thus reduced and damage occurs less frequently, because the torch operates all the time in the optimal manner. Consumption rate of nozzles is reduced, as well as the number of work seizures, which both contribute to higher profitability of production.

A preferred embodiment of the invention provides electrode adjustment in the axial direction of nozzle. The depth adjustment of the electrode provides an optimal control of the pilot arc which ensures easy ignition of the main arc.

The above described benefits are particularly important in conjunction with small-orifice plasma torches. If the torch is provided with a fixed centering mechanism, the torch components must be manufactured to very tight tolerances in order to assure correct alignment of the electrode tip with respect to the nozzle orifice. Despite the accurate tolerances, a high wear rate of nozzles results, since the slightest deviation of the nozzle orifice center point causes a high relative error in the position of the electrode tip with respect to the diameter of the orifice. The electrode centering mechanism according to the present invention permits correct alignment of the electrode tip even in small-orifice nozzles and stability of alignment during welding. Thus, the use of extremely-small-orifice nozzles becomes possible. Using a small-orifice nozzle, an extremely low and controlled heat effect can be applied resulting in a narrow welding butt. Such a torch can be used for welding small and thin pieces, and the weld quality attained is improved. Due to the reduced heat import to the workpiece, thermally induced stresses are diminished, the effect of shielding gas is improved and weld punctures are rare. In many occasions electron beam welding can be replaced by so-called microplasma welding performed using a small-orifice plasma torch.

BRIEF DESCRIPTION OF THE DRAWINGS

The invention is next examined with the help of exemplifying embodiments illustrated in the attached drawings, in which.

DETAILED DESCRIPTION OF THE INVENTION

Figure 1:
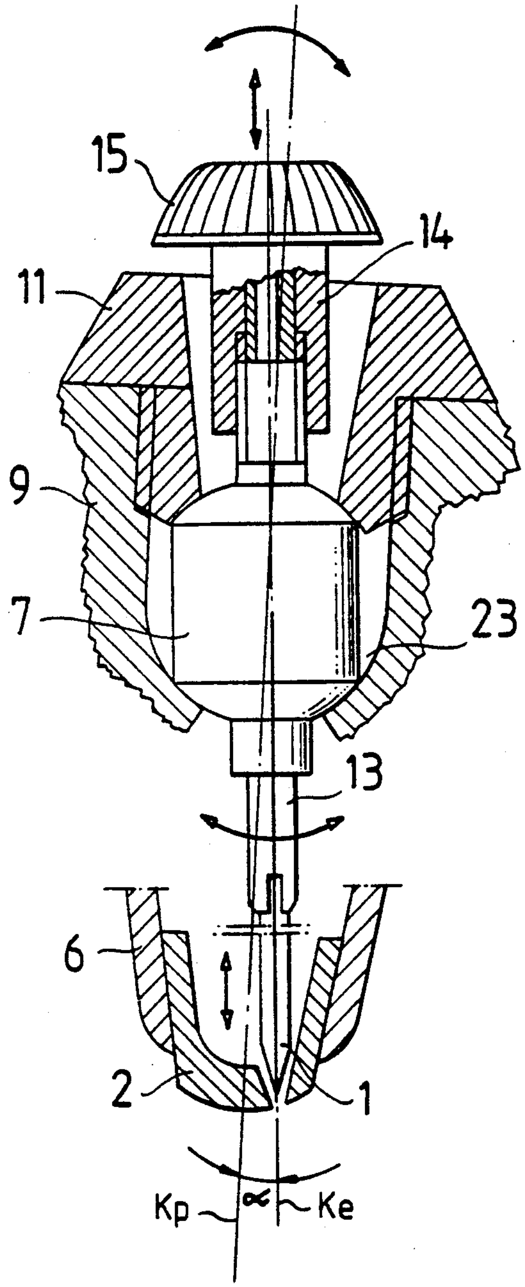
FIG. 1 shows diagrammatically the operating principle of the invention.

FIG. 1 illustrates a mounting and centering assembly in accordance with the present invention for a center electrode 1, whereby the assembly is implemented with the help of a ball joint. A holder collet 13 of the center electrode 1 is attached to a spherical element 7 of the ball joint so as to allow the collet to pass through the spherical element 7 along its center axis. To simplify its manufacturing, the spherical element 7 is made principally cylindrical with only its face surfaces being spherical. The center electrode 1 is inserted in the holder collet 13. The spherical element 7 is pivotally mounted in the upper body part 9 of the plasma torch in a bearing box 23, whose inside surface is spherically shaped to conform with the face surface of the spherical element 7. The spherical element 7 can be locked in place in the bearing box 23 with the help of a tightening gland nut whose end face at its threaded portion 11 is machined to conform with one spherical face end of the spherical element 7. The threaded portion 11 mates with the upper body part 9 of the torch head by way of threads.

The upper part of the spherical element 7 has a cylindrical threaded portion on which an adjustment gland nut 14 of the center electrode is screwed. The upper end of the adjustment gland nut 14 is covered by a knob 15 made of insulating material.

Furthermore, FIG. 1 illustrates a plasma torch nozzle 2, whose orifice eccentricity from the center axis is greatly exaggerated. The nozzle 2 is attached to the lower body part 6 of the plasma torch head and the tip of the electrode 1 is aligned in the center of the orifice of the nozzle 2. The center axis Ke of the electrode 1 and the center axis Kp of the torch head are misaligned by an angle $\alpha$.

The alignment of the electrode 1 in the orifice of the nozzle 2 takes place as follows. The tightening of the spherical element 7 is released suitably by rotating the tightening gland nut along its threaded portion 11. When the spherical element 7 is appropriately slack in the bearing box 23, the spherical element 7 becomes pivotally adjustable by rotating the knob 15. Then, the knob 15 and the tip of the electrode 1 move in the manner indicated by the curved arrows. The electrode alignment can be performed either by looking at the tip of the electrode 1 in the orifice of the nozzle 2, or alternatively, during ignited pilot arc, by evaluating the straightness and constriction of the arc, whereby the electrode 1 is moved until a desired quality of the pilot arc is attained. As soon as the proper position of the electrode 1 is found, the spherical element 7 can be locked in the bearing box 23 by screwing the threaded portion 11 of the tightening gland nut firmly against the spherical element 7. It is also possible to leave the tightening torque of the spherical element 7 to constant value, whereby the tightness is set to a level which allows the adjustment of the spherical element 7 with a reasonable force, yet locking it in a stationary position during welding. The tightening torque simultaneously seals the bearing box 23 gas-tight.

The depth adjustment of the center electrode 1 is effected by rotating the knob 15. When the knob 15 is rotated, it is shifted along the threads of the spherical element 7, thus moving the holder collet 13 of the center electrode 1 vertically in the manner indicated by the arrow. The depth adjustment mechanism and the depth adjustment of the electrode 1 is discussed in greater detail later in this text.

Figure 2:
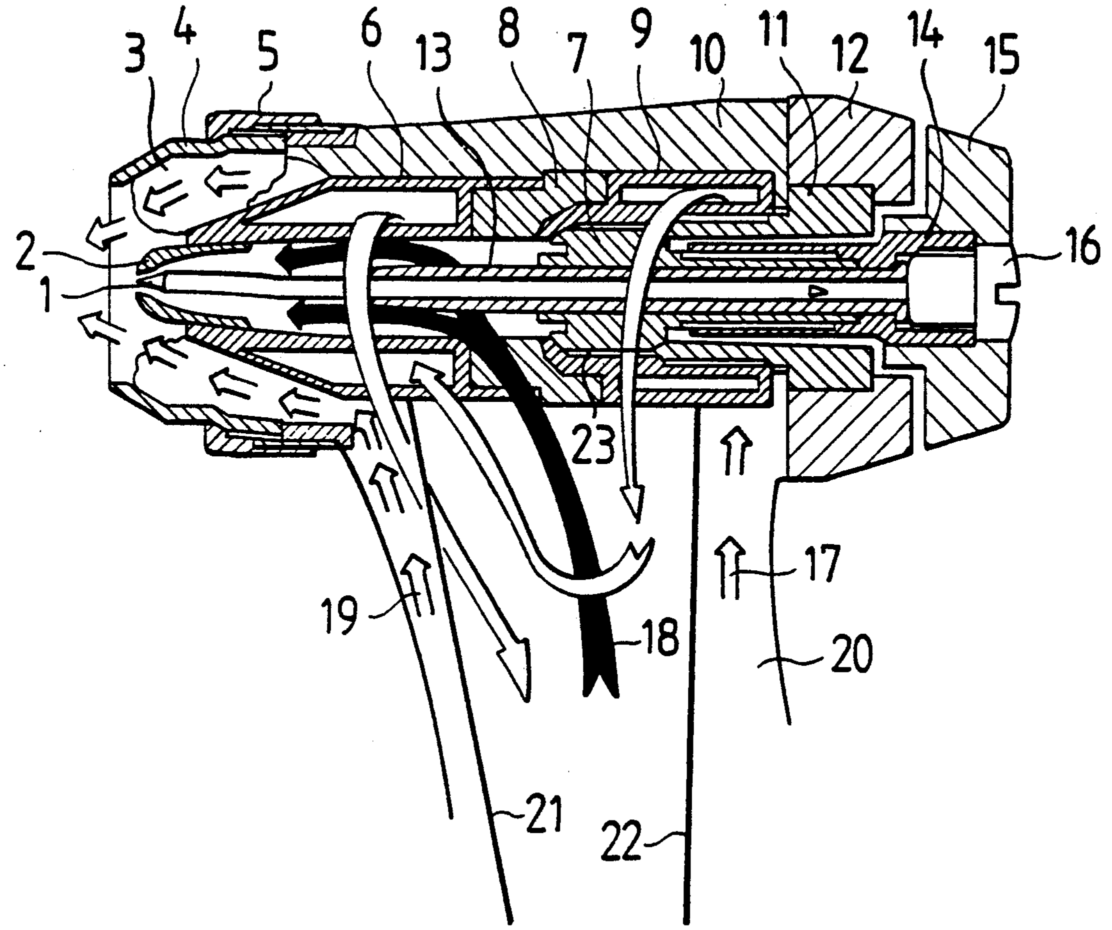
FIG. 2 shows a detailed sectional view of a preferred embodiment of the invention.

FIG. 2 illustrates an embodiment of the plasma torch according to the present invention. In this diagram the flow of the cooling water is indicated by elongated hollow arrows 17, the flow of the plasma gas by solid black arrows 19 and the flow of the shielding gas by short hollow arrows 19. Detailed discussion on the cooling of the torch and the behavior of the gas flows is omitted herein, because the routing of such flows in a plasma torch is conventionally known and the flow patterns are not related to the implementation of the present invention.

The cover 10 of the torch body is made of epoxy plastic and it is continued to form a handle 20, which houses the required electrical, gas and water conduits. The cover 10 contains the water-cooled upper body part 9 of the torch head that houses the bearing box 23 for the spherical element 7. Electrical current to the center electrode 1 is routed to the electrode 1 via the upper body part 9 and the connection to the upper body part 9 is by way of a conductor 22. The upper body part 9, at the side which houses the bearing box 23, provides backing support for a separating insulator piece 8 whose other end rests against a water-cooled lower body part 6. Electrical current to the lower body part 6 is routed via a conductor 21, and the current is conducted via the lower body part 6 to the plasma nozzle 2 attached to the end of the lower body part. The above described elements provide the conductive path for the pilot arc struck between the nozzle 2 and the electrode 1. In this design the orifice diameter of the plasma nozzle 2 can be selected in the range 0.35 . . . 3.2 mm.

At the end of the torch body the plasma nozzle 2 is surrounded by a ceramic heat shield 4 for the shielding gas that is attached to the cover 10 of the plasma torch with the help of a retaining ring 5. The gas space remaining between the ceramic heat shield 4 and the lower body part 6 is filled with a glass-wool laminarizing stabilizer 3 of the shielding gas flow. The electrode 1 with its holder collet 13 is placed in the center of the plasma torch. The cylindrical element 7 is locked to the bearing box 23 by tightening of the threaded portion 11 of tightening gland nut. An insulated knob 12 is attached to the upper end of the threaded portion 11 of the tightening gland nut, whereby the rotation of the knob makes it possible to turn the gland nut along the threads.

The holder collet 13 of the electrode 1 is extended through the spherical element 7 into an adjustment gland nut 14. The end of the holder collet 13 is provided with a flange which abuts the shoulder of a hole in the adjustment gland nut 14. A screw 16 in the center hole of the adjustment gland nut 14 pulls the holder collet 13 against the shoulder of the hole. Attached to the upper end of the adjustment gland nut 14 is finally a knob 15, whose rotation and pulling/pushing makes it possible to adjust the position and depth of the electrode 1.

The depth adjustment of the electrode 1 takes place as follows. The center electrode 1 is pushed into the holder collet 13. The holder collet 13 is comprised of a copper tube fabricated by cold-drawing through a die to exact dimensions, so the center electrode 1 attaches sufficiently tightly to the collet without additional retaining. When the center electrode 1 is in place in the holder collet 13, the plasma nozzle 2 is mounted. At this stage already it is possible to see the electrode tip position relative to the orifice of the nozzle 2. If the electrode 1 protrudes out from the orifice of the nozzle 2, it can be retracted into the nozzle by, e.g., pushing the nozzle 2 against a table. After this, the depth adjustment of the electrode 1 can be performed by turning the knob 15.

The knob 15 is fixed to the adjustment gland nut 14, which further attaches to the spherical element 7 by way of its threads. When the knob 15 is rotated, the adjustment gland nut 14 moves along its threads and simultaneously shifts the holder collet 13 of the electrode 1, thus moving the electrode 1. The depth adjustment of the electrode 1 can be accomplished by visual control, or alternatively, monitoring the behaviour of the pilot and main arcs.

In addition to those described above, the present invention can have alternative embodiments. For example, to simplify the construction, the depth adjustment facility of the electrode 1 can be omitted, whereby the depth of the electrode 1 must be performed by pushing the electrode 1 into its holder collet to sufficient depth, which may be awkward. The gas-tightness of the plasma torch can be ensured by the use of O-rings, while the tightness of the spherical element 7 in the bearing box 23 is, however, sufficiently good without the use of additional seals provided that the components are manufactured to sufficiently tight tolerances. The insulator part 12 of the tightening gland nut, the knob 15, the screw 16 and the separating insulator piece 8 are made of electrically insulating materials such as, e.g., synthetic polymers. The metal parts of the plasma torch are advantageously made of copper and brass due to their good thermal conduction and machinability properties. The materials of the plasma torch are not, however, crucial for the function of the present invention.

The spherical element 7 of the plasma torch can be replaced by a standard-size ball bearing, whereby the bearing box 23 in the upper body part 9 is simplified by its construction. The shape of the spherical element 7 can be varied provided that it has suitable gliding surfaces on which the element can be pivotally rotated. The pivotal support could also be implemented using a universal joint with multiple axes, but this construction leads to an extremely complicated design, which may be justified only for special cases. Even other kinds of pivotal structures are feasible; they can yet easily result in quite elaborate constructions. A minimum requirement for the function of the pivotal support in accordance with the invention is that it has at least two degrees of freedom.

The depth adjustment of the electrode 1 can further be implemented by, e.g., attaching to the end of the support collet 13 a rod made of an electrically insulating material with a sufficient length to extend through the insulating part of the threaded portion 11 of the adjustment gland nut. In this construction the depth of the electrode is adjusted by manually pulling or pushing the electrode 1, and then locking the insulating rod in place with the help of, e.g., a conical retaining collet. This kind of a construction can be designed such as to allow the removal of the electrode 1 from above from the plasma torch, which makes it possible to replace the electrode without detaching the nozzle 2.

The principal advantages of the invention are attained in the use of so-called microplasma torches, because the present invention makes it possible to use plasma torches of extremely small jet size; however, the size of plasma torch is insignificant to the scope of the invention, and the invention is equally applicable to plasma cutting torches.

What is claimed is:

1. A plasma welding torch, comprising:

a torch body provided with a longitudinal axis;

a plasma nozzle attached to the torch body, said plasma nozzle being provided with an orifice for generating a plasma arc;

an electrode provided within the torch body via a pivotal element, which allows the tip of the electrode to be pivotally adjusted in relation tot he orifice of the plasma nozzle;

sealing means for sealing orifices between the torch body and the pivotal element and between the pivotal element and the electrode when the position of the tip of the electrode is adjusted;

tightening means for adjusting a force needed to pivot the electrode held in the pivotal element and for locking the electrode and the pivotal element to a working position; and means for pivoting the electrode held in the pivotal element in order to adjust the position of the tip of the electrode in relation to the orifice of the plasma nozzle.

2. A plasma welding torch, comprising:

a torch body provided with a longitudinal axis;

an electrode and a plasma nozzle attached to the torch body, said plasma nozzle being provided with an orifice for generating a plasma arc;

a spherical element pivotally mounted in a bearing box of the torch body, an end surface of the bearing box being spherically shaped to conform to an end face of the spherical element;

a tightening gland nut, provided with an end face which conforms to the other end face of the spherical element, for locking the spherical element in a pivotal position; and an adjustment gland nut for adjusting a depth of the electrode along the longitudinal axis of the torch body independently of the pivotal position of the spherical element.

3. A plasma welding torch as defined in claim 2 wherein the electrode is mounted to the spherical element by means of a holder collet.

4. A plasma welding torch as defined in claim 2, wherein the adjustment gland nut is attached to the spherical element by a threaded connection.

5. A plasma welding torch as defined in claim 2, wherein the tightening gland nut is attached by a threaded connection to the bearing box.

6. A plasma welding torch as defined in claim 2, wherein the adjustment gland nut is covered by a knob of insulating material.

* * * * *